United States Patent
Smith et al.

(10) Patent No.: US 12,273,349 B2
(45) Date of Patent: *Apr. 8, 2025

(54) SYSTEMS AND METHODS FOR TEMPORARY ACCESS WITH ADAPTIVE TRUST LEVELS FOR AUTHENTICATION AND AUTHORIZATION

(71) Applicant: EMC IP Holding Company LLC, Hopkinton, MA (US)

(72) Inventors: Hana Schuster Smith, Boulder, CO (US); Janardan Revuru, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,952

(22) Filed: Mar. 28, 2024

(65) Prior Publication Data

US 2024/0244058 A1 Jul. 18, 2024

Related U.S. Application Data

(63) Continuation of application No. 17/234,333, filed on Apr. 19, 2021, now Pat. No. 11,956,240.

(51) Int. Cl.
*H04L 29/06* (2006.01)
*H04L 9/40* (2022.01)

(52) U.S. Cl.
CPC ......... *H04L 63/102* (2013.01); *H04L 63/083* (2013.01); *H04L 63/101* (2013.01); *H04L 63/105* (2013.01); *H04L 63/20* (2013.01)

(58) Field of Classification Search
CPC ... H04L 63/102; H04L 63/083; H04L 63/101; H04L 63/105; H04L 63/20; H04L 63/0815; H04L 63/0838; H04L 63/1425; H04L 63/108

See application file for complete search history.

(56) References Cited

U.S. PATENT DOCUMENTS

| | | | | |
|---|---|---|---|---|
| 10,454,940 | B2* | 10/2019 | Lander | H04L 63/0815 |
| 10,567,385 | B2* | 2/2020 | Quach | H04L 63/10 |
| 11,258,788 | B2* | 2/2022 | Tsarfati | H04L 63/0853 |
| 11,956,240 | B2* | 4/2024 | Smith | H04L 63/108 |
| 2017/0244864 | A1* | 8/2017 | Ishino | H04N 1/4433 |
| 2019/0058706 | A1 | 2/2019 | Feijoo et al. | |
| 2021/0352064 | A1* | 11/2021 | Tsarfati | H04L 63/1416 |
| 2022/0174062 | A1* | 6/2022 | Tsarfati | H04L 63/10 |
| 2022/0407866 | A1* | 12/2022 | Tanutama | H04L 63/108 |
| 2023/0131790 | A1* | 4/2023 | Lennartz | H04L 9/3213 |
| | | | | 713/168 |

* cited by examiner

*Primary Examiner* — Baotran N To
(74) *Attorney, Agent, or Firm* — Workman Nydegger

(57) ABSTRACT

One example method includes providing temporary access to a computing system and to providing temporary access as a service. The features of a temporary access can be defined by an entity and a user may be able to obtain a token that includes these features, which may be embedded in the token as claims. The user's access is then controlled in accordance with the embedded claims. The temporary access as a service can be federated. The token may include trust levels and tolerance limits. Further, aspects of the temporary access can be monitored and/or changed. Adjustments to trust levels can be automated or manually performed. Further trust for specific users can be gained or lost over time based on at least previous accesses.

20 Claims, 9 Drawing Sheets

Trust Levels 502:

| Trust Level | Account Type | Example | Previous Logins | Permissions and Restrictions | Destructive Command Delay |
|---|---|---|---|---|---|
| Low | Social ID | Open ID, Facebook, Google | None | Full access after X minutes of login | 10 minutes |
| Medium | Semi trusted ID (Partner) | Partner, Authorized Entity | Social ID + 2 logins | Full access after X/2 minutes of login | 5 minutes |
| High | Trusted ID (Dell Tech) | Dell Support | Social ID + 5 Logins Trusted ID + 2 logins | Full access from Login | 2 minutes |

Tolerance Limit 504:

| Tolerance Limit | Monitoring on anomaly detection | Continuous Monitoring |
|---|---|---|
| Low | 1 Warning before revoke of access | 1 Warning before revoke of access |
| Medium | 1 Warning before active monitoring 2 Warnings before revoking access | 2 Warnings before revoking access |
| High | 1 Warning before active monitoring 2 Warnings before active monitoring | Warning that User is being monitored |

Figure 5

SYSTEMS AND METHODS FOR TEMPORARY ACCESS WITH ADAPTIVE TRUST LEVELS FOR AUTHENTICATION AND AUTHORIZATION

FIELD OF THE INVENTION

Embodiments of the present invention generally relate to accessing computing systems. More particularly, at least some embodiments of the invention relate to systems, hardware, software, computer-readable media, and methods for providing secure temporary access, including authentication and authorization, to a computing system.

BACKGROUND

IT (Information Technology) generally refers to computing systems and/or the people that manage the computing systems. Computing systems can be complex from both a hardware perspective and a software perspective. An IT department is tasked with ensuring that all systems are operating efficiently and that users have appropriate access to the various systems.

Many companies, for various reasons, outsource at least some of their IT needs. A company may enter a service contract (e.g., a service level agreement (SLA) or repair agreement) with a provider. The provider then provides IT services such as software/hardware repairs and upgrades, rebuilds, replacements, or the like.

Often, a service provider (e.g., a person or a team or persons) must enter the company's building (or computing environment) in order to provide IT services. The service provider may receive a physical badge that may allow the service provider to access various areas of the building. However, providing the user with a similar IT equivalent that provides controlled access to limited systems or that prevents access to systems that are not authorized is difficult.

As a result, there is often a need for the service provider to be accompanied while inside the building or inside the computing environment, which may be a datacenter. This is contrary to the point of outsourcing the IT services because accompanying the service provider consumes the cost of an employee and incurs the loss of work that the employee would otherwise be performing.

Attempts to solve these issues, such as role-based access control (RBAC), have been made. However, RBAC is problematic for many reasons. In RBAC systems, there is substantial work involved to enter a service provider (often a non-employee) into the company's system, provide credentials, set roles, and the like. Communication may be required between various organizations of the entity to adequately generate RBAC for a non-employee. RBAC is stringent and fixed and cannot easily adapt to changes in a user's roles or needs. More specifically, RBAC proves cumbersome and needs to be constantly adjusted when small variations in the role occur and for an ever-increasing number of roles. Further, RBAC does not accommodate contextual information such as location, time of access, and the like. Plus, RBAC is not suitable for single use or temporary access.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 discloses aspects of trust levels and tolerance limits;

DETAILED DESCRIPTION OF SOME EXAMPLE EMBODIMENTS

Figure 1:
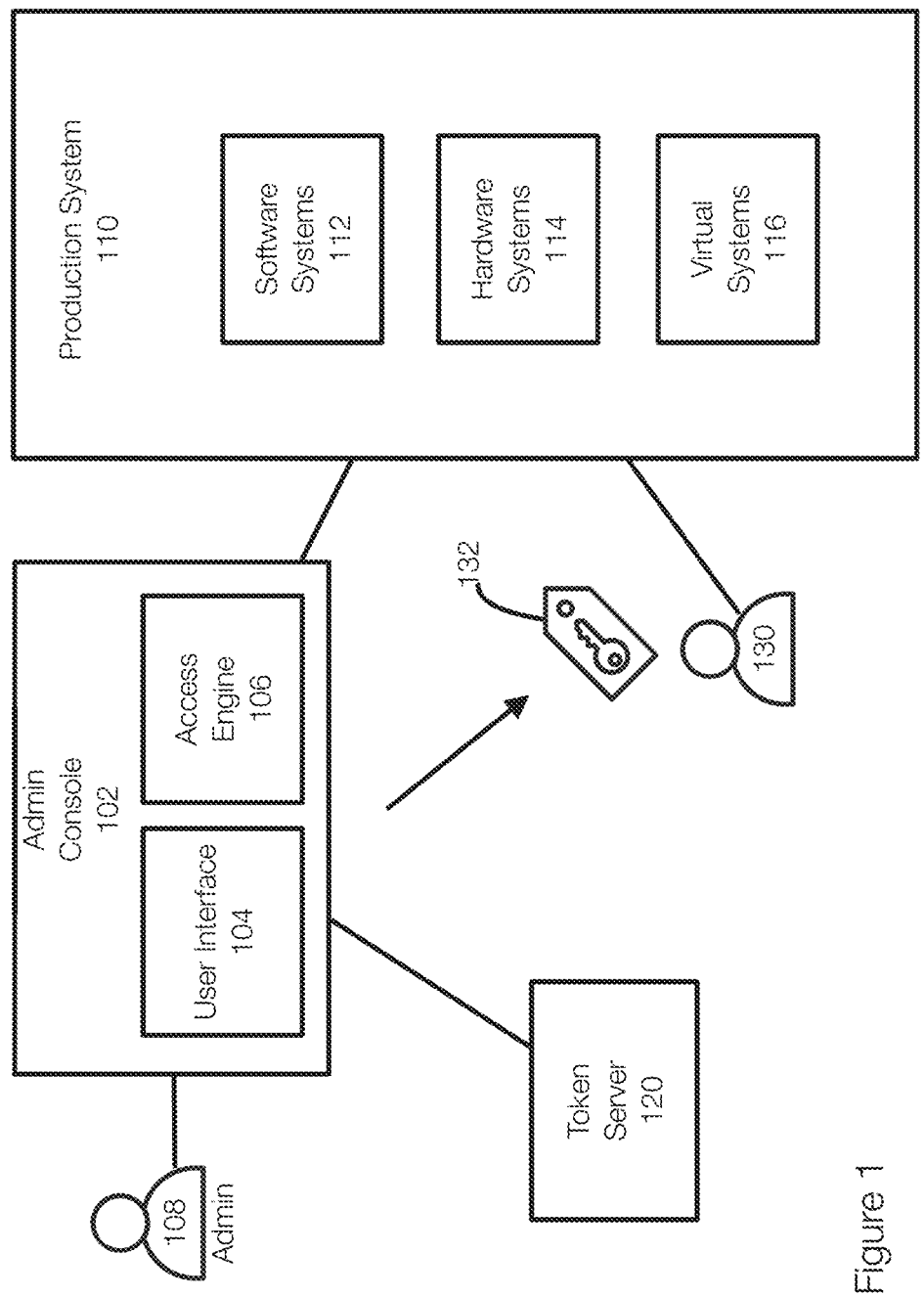
FIG. 1 discloses aspects of a computing environment in which temporary access and/or temporary access as a service may be implemented.

Embodiments of the present invention generally relate to access control. More particularly, at least some embodiments of the invention relate to systems, hardware, software, computer-readable media, and methods for providing temporary access with adaptive trust levels. Advantageously, the temporary access can be quickly adapted based on changes to trust levels or for other reasons.

Embodiments of the invention provide a user (e.g., a service provider or other person) with temporary access to a computing system or to a portion of the computing system. By way of example only, embodiments of the invention provide a user with temporary access to specific resources and a secure login. Embodiments of the invention also provide monitoring and anomaly detection. Temporary access control may also include, for example, alerts or notifications. These alerts or notifications may be provided to the user to whom temporary access was granted, the system administrator, the system owner, a monitoring agency, or the like. The ability to implement adaptive trust levels for temporary access and to perform anomaly detection, allows the user's access to be adjusted or restricted in real time or close in time to the detection of an anomaly. When temporary access is implemented as a federated service, the ability to control a user's access can be expanded to account for trust gained/lost with accesses performed at multiple entities.

More specifically, embodiments of the invention can extend beyond a single computing system and can be provided as a service—a secure Temporary Access-as-a-Service (STAaaS). This service can be provided to many different entities. By providing anomaly detection, IT systems can take immediate action if necessary. This protects IT systems from various threats and helps reduce costs associated with managing IT systems.

Secure temporary access may include claims-based authentication with adaptive trust levels. In claims-based authentication, an authenticated user may be issued a token that includes claims. The claims may contain specific information about the user, the user's roles, permissions, or privileges, or the like. Further, tokens may be signed or encrypted.

The token (or user) may be associated with a trust level, which may be adapted or changed. For example, as the user's actions are tracked, the level of trust in that user may change. Changes in the trust level allow an entity to change the user's access at any time. For example, if the token service receives information that impacts the trust level of a user, that information can be used to take action on existing tokens and the access associated with the tokens. More specifically, the token service may communicate with an admin console such that the admin console can act on changing trust levels.

More specifically, embodiments of the invention allow trust levels to be adapted in the context of providing temporary access. Users that perform IT services (or other services) in accordance with the claims embedded in the token may have their associated trust level validated or increased. Users that exhibit (intentional or unintentional) untrustworthy behavior may have their trust level decreased. For example, a session that takes too much time, attempts to access resources to which access has not been granted, and the like are examples of behavior that may adversely impact trust levels.

Secure temporary access as a service can be expanded from the perspective of a single entity to a federated provider that can facilitate secure temporary access as a service to multiple entities and across those entities. This allows entities, in effect, to benefit from the good/bad behavior of a user at other entities. A trust service may receive information from a first entity that reduces a user's trust level. A second entity then benefits from the trust level adjustment if that user is granted access to the second entity's systems. Similarly, increases in trust levels can also benefit entities as less monitoring may be required, for example.

Embodiments of the invention further allows user activities to be correlated to events in a computing system such as malware (e.g., ransomware, virus, trojan, etc.) detection. For example, an event could be traced to a user and/or the system can be automatically scanned after the user's service window ends or when the user logs out of the computing system.

FIG. 1 illustrates an example of a computing environment in which embodiments of the invention may be implemented. FIG. 1 illustrates a production system 110 that may include software systems 112, hardware systems 114 and/or virtual systems 116 (e.g., virtual machines, containers). The production system 110 may be an on-premise system, a data center, or the like or combination thereof. The production system 110 may provide or include servers, storage, memory, network gear, virtual resources, power, cooling, applications, and the like.

The production system 110 may be associated with an admin console 102, which may operate on a server, an admin console host, or the like in the production system. The admin console 102 may be associated with a user interface 104 and an access engine 106.

In this example, the production system 110 may be subject to or associated with an SLA. IT services, for example, may be provided by a service provider in accordance with the SLA. The service provider (referred to herein as user 130) may be a person that works with or on the production system 110 in accordance with the terms of the SLA. By way of example only, the production system 110 may be associated with an organization or entity and the user 130 may not be an employee of that entity, but is a third-party with respect to the entity. The user 130 may be part of an information services group (ISG).

An administrator (admin 108) uses the access engine 106 via the user interface 104 to determine features that will be associated with the user 130. Each time the user 130 needs to access the production system 110, the features are entered. Default templates may be used to simplify this process, but these templates can be changed according to need or circumstance. When based on a token, a token may be generated for each access.

For example, the user interface 104 may allow the admin 108 to specify, for the user 130, a name or email, a date/time, a duration of access or a service window, access privileges, number of operations, level of monitoring, anomaly detection, alerting options, or the like or combination thereof. These are examples of features that allows for temporary access. These features may be embedded in a token as claims and the token is associated with a trust level and/or a tolerance limit.

The access engine 106 may present a workflow or wizard to the admin through the user interface 108 such that these features can be specified. This allows a single access to be defined.

For example, the user 130 may share an ID (identifier) such as an email with the admin console 102. The user 130 may also go through a registration process with the admin console 102 in which the user 130 generates a password for example. The user may be authenticated or registered based on the provided identifier. Example identifiers may include open identifiers, semi-trusted identifiers, and trusted identifiers. An open identifier may be able to authenticate a person while a trusted identifier may also be associated with existing information about the user that can be used in generating the token. In other words, the trust level of a user logging in with an open identifier is likely to be lower than the trust level of a user logging in with a trusted identifier.

Once the user 130 is registered, the user may provide their ID to the admin console 102. The user 130 may also share a service contract identifier. The admin 108, via the user interface 104, may enter temporary access details (e.g., features of the access) based on the service contract identifier and the identifier using an access engine 106. The access engine 106 may communicate with a token server 120. The access engine 106 provides the token server 120 with the features entered via the user interface 104.

The token server 120 may maintain information regarding trust. This allows the token server 120 to generate a token 132 that includes the features (e.g., embedded in the token 132 as claims) and a trust level. The token 132 allows the user 130 to have specific system and software privileges, provides access to specific resources, and enables secure login. The temporary access is also provided with anomaly detection and configurable alerts. More specifically, the token 132 may trigger alerts, may monitor thresholds, and may provide dynamic threshold adjustments. The access engine 106, which is an example of a claims-based authentication system with adaptive trust levels that can enable temporary access, is not burdened by the requirements of RBAC solutions as previously discussed.

Once the token is received at the access engine 106 from the token service, the admin console 102 may provide the user 130 with a link to the admin console 102 or other access point. The link may include or is associated with the token 132. Stated differently, the user 130 is thus linked to a temporary access session governed by the claims in the token.

Once this process of providing the user 130 with a link (e.g., in an email), the user is prepared to perform the access. In one example, the user 130 may use the link to login to the admin console 102 or to the production system. For example, the token 132 may be associated with a service scheduled to occur on a specific date at a specific time. If the user 130 logs in at the appropriate time, access in accordance with the claims in the token 132 is granted and an access session may begin.

The session of the user 130 may be monitored. The user may be monitored continually. Alternatively, monitoring may occur after an anomaly is detected. If an anomaly is detected, the access of the user 130 can be changed (e.g., terminated). The specific action may depend on the trust level. A trusted user, for example, may be allowed certain anomalies while a less trusted user is not. For example, an attempt to access a resource that is not authorized for this session may result in an alert for a trusted user. The same attempt by an untrusted user may result in termination of the session and of the user's access.

When the session is complete, a session score or other information may be provided to the token server 120 and the token server 120 can update the trust level of the user 130 based on the score. The score may reflect aspects of the session including whether the work was performed efficiently and within the scheduled time, whether anomalies were detected, and the like.

Figure 2:
FIG. 2 discloses aspects of a workflow or user interface for configuring temporary access.

FIG. 2 illustrates an example of a user interface configured to set a user's features (the claims embedded in the token) for a temporary access session. FIG. 2 illustrates a user interface 200 presented by the access engine 106 to set a series of features for a specific access and generate a link that can be included in an email (or other message) as part of the workflow or as part of a service ticket request. These features are distinct from and may be more extensive than features for typical full time employee (FTE) users. The user interface 200 allows users to be added, and allows various features to be specified.

For example, the features set by the access engine 106 may include specifying the name and/or email of the user. A date and time may also be specified. Thus, the user 130 would only have access to the production system 110 on the specified date and time. The features may express a duration of access or a service window. For example, a particular service may be expected to take 3 hours. The service window may be specified as 3 hours.

The features may specify which specific systems can be accessed (e.g., access only a particular server or volume, or a particular application). The user's privileges may also be specified, such as read/write privileges. The features may identify the number and type of operations (task access, upgrade, or the like).

Example features thus include, by way of example and not limitation, name or email, date, time, duration of access, access to specific systems, access privileges (e.g., read/write), number and type of operations (e.g., task access, upgrade), monitoring and alerting options.

The features related to monitoring and alerting determine how the user is monitored and/or which alerts are generated. For example, the user may be monitored and the user's actions logged for the entire session. More specifically, monitoring may include logging login and log out times, duration of sessions, all resources accessed (and for how long), all operations executed, click paths, and the like. Based on trust level, the level of monitoring can range from always on to periodically, or to when an anomaly is detected.

Anomaly detection may identify attempts to go beyond what is set forth in the token. For example, an attempt to access a system (e.g., volume, data, server, network) that is not authorized may result in various actions such as increased monitoring, alerts to different persons, access revocation, and the like. Anomaly detection may further identify deviations from the permitted access during the session such as attempts to access unauthorized data, attempts to export asset information, or the like.

Alerting options may vary as well. The alerts, which may be generated in response to a detected anomaly or that may be generated for actions performed by the user while monitoring is performed, may be sent to the user, to an administrator, to a security team or the like as a text, an email, a pop-up, a console alert, or the like. The alerts may identify the cause of the alert, the consequence of the alert, and the like.

These features can be adapted or leveraged for various use cases. For example, a service session may be distinct from an auditing session and the features may reflect these distinctions. Further, the user interface 200 can be prepopulated with a smart default, which may adapt overtime to the users or to specific users. Further the features can be customized. Once a user is created, the features can be altered (e.g., add, delete, modify).

Embodiments of the invention can be used in a local manner and/or in a federated manner. A token server or service can be local or specific to an entity. A token server or service can also be federated or accessible by multiple entities.

Figure 3A:
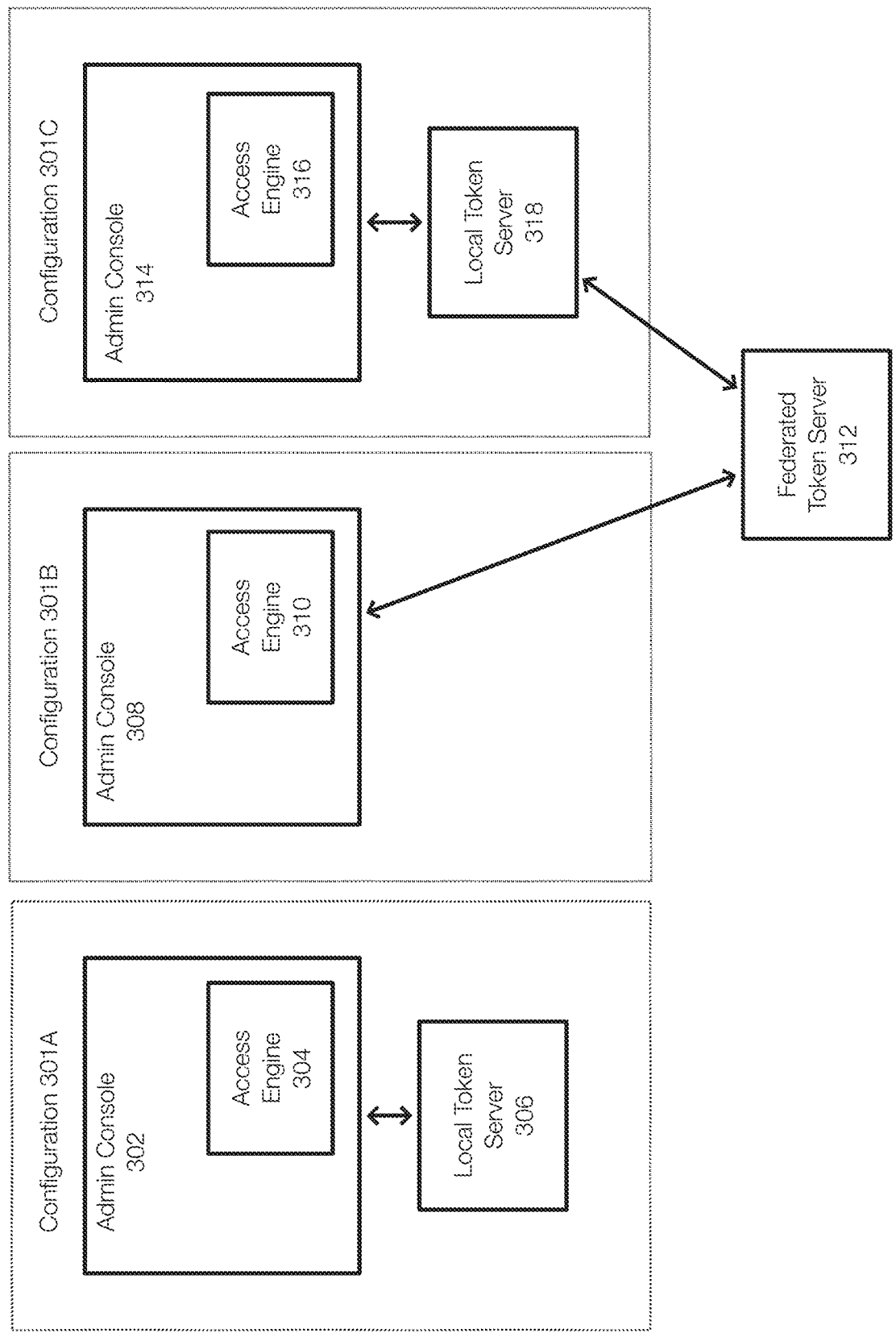
FIG. 3A discloses aspects of temporary access as a service configurations.

FIG. 3A illustrates example configurations of a secure token service that includes local and/or federated token service configurations. In each of the configurations shown in FIG. 3A, the token server (or service), whether local or federated, may receive features from an access engine. The token server embeds the features as claims in a token and returns the token and a trust level to the access engine.

The configuration 301A is an example of providing temporary access using a local secure token service. In the configuration 301A, the access engine 304 of an admin console 302 may communicate with a local token server 306. This example may allow an entity associated with the configuration 301A to manage users that may provide IT services (or other services). In this example, the local token server 306 is specific to an organization (e.g., a single entity).

The configuration 301B is an example of providing temporary access using a federated secure token service. In the configuration 301B, the access engine 310 of the admin console 308 may communicate with a federated token server 312. The federated token service 312 may return a token and a trust level to the access engine 310. One benefit of the federated token server 312 is that updates to a user's trust level can be generated from multiple entities. The trust level may further be based on the user's actions across multiple systems.

The configuration 301C is an example of providing temporary access using a local token server 318 and/or the federated token server 312. In this example, the local token server 318 may operate as in the configuration 301A. In addition, the local token server 318 can validate unrecognized and/or recognized identifiers against the federated token server 312.

The federated token server 312 can validate unrecognized or recognized identifiers. For example, if an access engine 316 and local token server 318 receive a user identifier that is unknown, the local token server 318 can validate the user identifier with the federated token server 312. A know user identifier can also be validated.

In addition, the local token server 318 can update the federated token server 312. For example, actions or events that may impact the trust level of a user can be provided to the federated token server 318. In one embodiment, the local token server 318 can maintain a trust level for users. The federated token server 312 can also maintain and/or adjust trust level for users. Because the federated token server can be updated by the local token server 318, this information may be shared and used when the federated token server 312 generates tokens and trust levels for the same user, but for different entities. For example, the trust level returned by the federated token server 312 may differ from the expected trust level.

In addition, regardless of whether an entity has a local token server, the federated token server 312 can send alerts or notifications to local token servers or to local access engines. This allows for federated vulnerability detection or for the local access engines to adapt the temporary access granted to users to changes in the trust level. For example, the access engine 316 may revoke access if a degraded trust level is received from the federated token server 312.

Figures 3B, 3C:
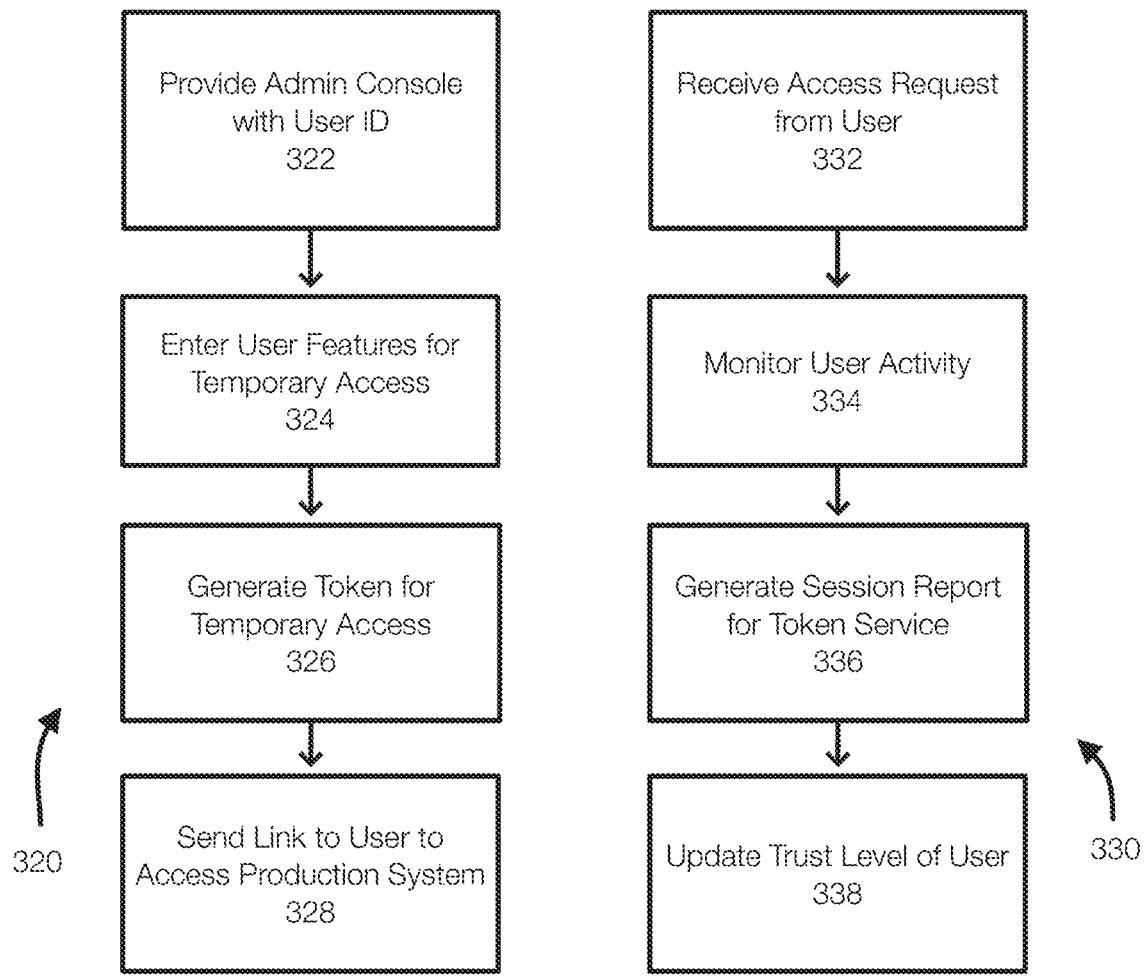
FIG. 3B discloses aspects of a method for managing temporary access in a computing environment.
FIG. 3C discloses aspects of a method for managing temporary access including monitoring user access and updating trust levels.

FIG. 3B discloses aspects of providing temporary access. FIG. 3C discloses aspects of accessing a system based on the granted access. The methods may be performed consecutively in some embodiments. The method 320 relates to the process of generating the token used for the temporary access.

Initially and assuming that a user is registered if necessary, a user may provide 322 an admin console with a user identifier. A contract or service identifier may also be provided by the user. In response, an administrator may enter features that are to be associated with the access being granted to the user and based on the associated service contract. Thus, the features entered into the access engine are related to the contract or service identifier and are configurable. The access engine then sends the features to a token server and a token is generated 326 for the temporary access. A link is then sent 328 to the user and the user can access the production system using the link.

in contrast to RBAC systems, the token is temporary, includes claims that describe the user and the allowed access, can be modified, and is flexible such that new privileges and new services can be added. The temporary access is time bound, schedulable, adaptive to access and trust levels. The access engine can provide an administrator with default templates to simply the process of entering features and is highly customizable. The temporary nature of the access contrasts with the RBAC, which include predefined roles and is intended for longer durations. RBAC is more suitable to full time employees. Adding users, who are not full time employees, to an RBAC system is time consuming and does not really meet the needs of providing temporary and adaptable access.

When a user logs in to the admin console, the user may or may not be registered. And registration may not be required. A user, for example, may login using different types of identification. In one example, the user may use existing identification services to register. For example, the user may login using credentials from another service such as an email system, a social media system, or the like. In one example, some of these authentication services may be more trusted than others. For example, if the authentication server is also providing temporary access as a service, the login may be associated with a user's history that is specific to the actions performed by that user in a computing system. Logging in with a social media account, in contrast, may authenticate the user but does not provide any information that allows for an elevated trust level.

FIG. 3C discloses aspects of temporarily accessing a production system. Initially in the method 330, the admin console may receive 332 an access request from a user. The user, for example, may click on the link provided when the token was generated as disclosed in FIG. 3B. Once the user is logged in, the session starts and the user activity may be monitored 334.

Once the session is terminated, a session report is generated 336 and provided to the token service. The report may include a score or other information that allows the trust level to be updated 338. The trust score may be increased, decreased, or unchanged.

As previously disclosed, the token issued by the token service may be associated with a trust level. The token may also be associated with a tolerance limit.

Figure 3D:
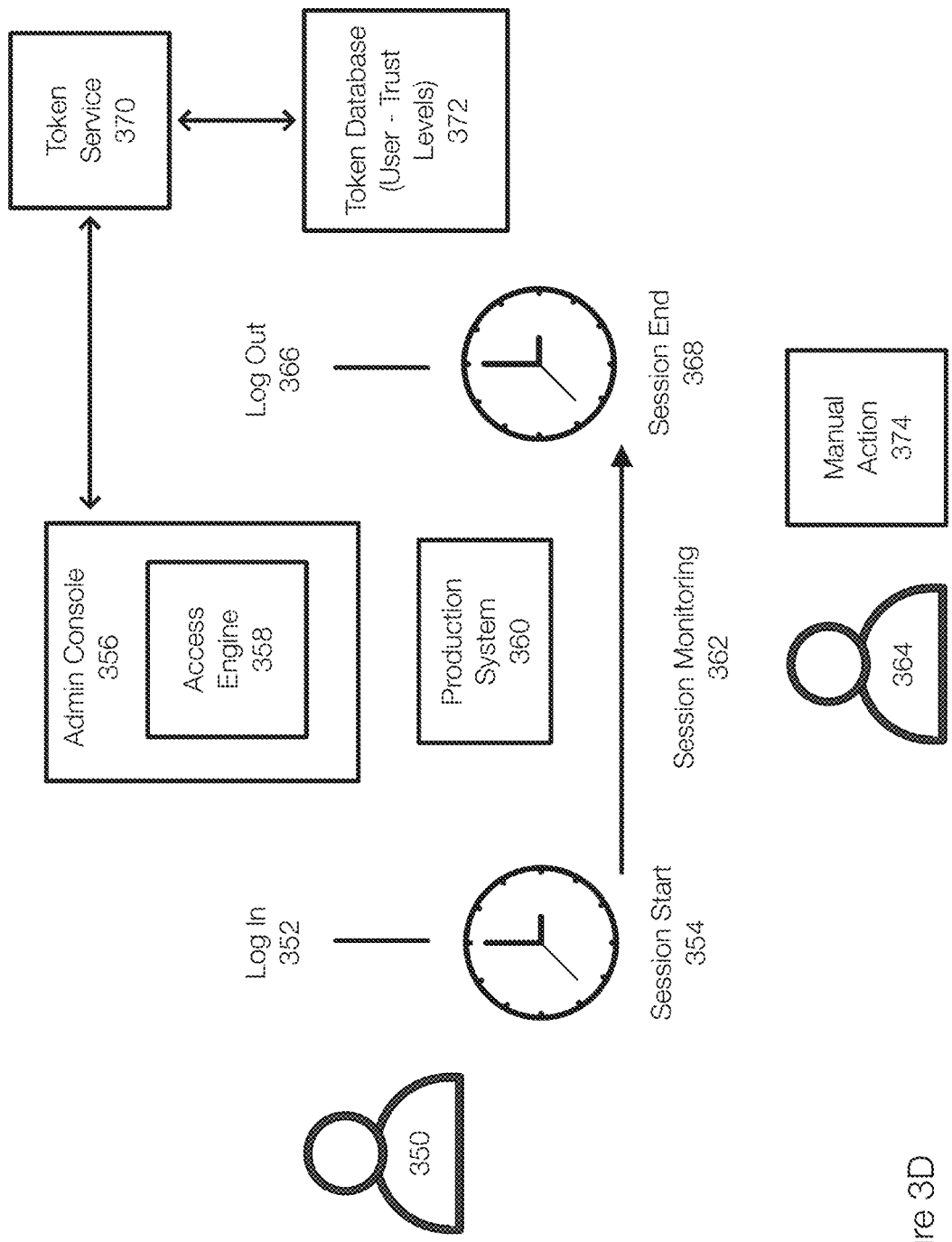
FIG. 3D discloses aspects of temporarily accessing a computing system.

FIG. 3D discloses aspects of accessing a computing system or a production system temporarily using a token. In FIG. 3D, a user 350 has received a token that includes claims. The token can be used to grant temporary access to the user 350 to the production system 360.

Once the token has been generated, the user 350 may login 352 to the admin console 356 and the session starts 354. As previously stated, the access granted by the token may be limited to a time window. Once the user 350 accesses the production system 360, the user 350 may be monitored 362. Monitoring 362 may take different forms and may be dependent on a trust level associated with the user's token. The session monitoring 362 may be continual or periodical. Monitoring may begin when an anomaly is detected. An anomaly detected, by way of example only, when the user 350 attempts to perform an action that is not permitted by the token. The access engine 358 may be configured to perform the monitoring, detect anomalies, and the like.

In some examples, an administrator 364 may take a manual action 374. For example, the administrator 364 may revoke access regardless of trust level. An administrator 364 may receive information that a trusted user account has been compromised during the session. The production system 360 may be under threat and temporary access accounts such as associated with the user 350 may be revoked. This allows actions to be taken on the temporary access regardless of trust level and independent of how the anomaly is identified.

When the session ends 368, the access engine 358 may update the token service 370 and the token service 370 may update a trust level of the user. In one example, the token service 370 (an example of the token services illustrated in other Figures) may be associated with a token database 372, that stores data includes users and their trust levels.

Figure 4:
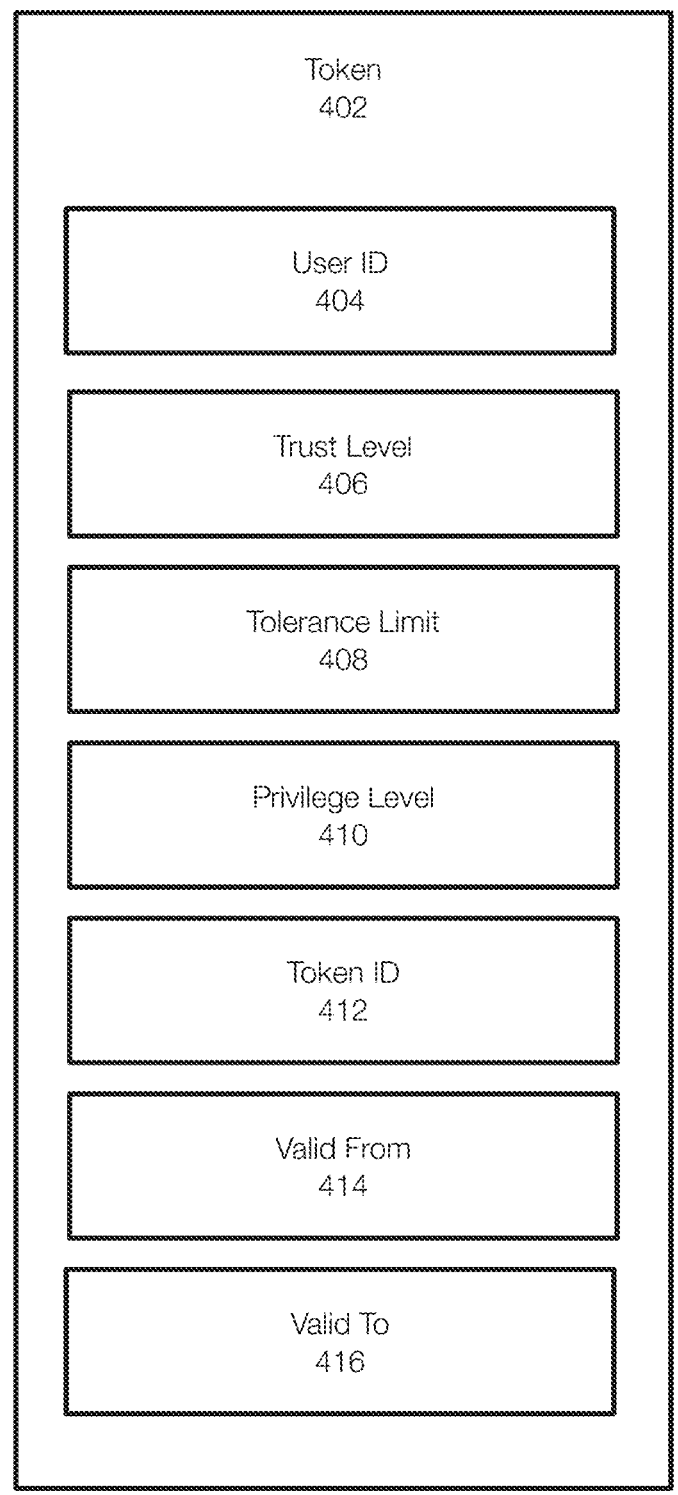
FIG. 4 discloses aspects of a token using in providing temporary access to a computing system.

FIG. 4 illustrates an example of a token. The token 402 may include a user ID 404, a trust level 406, a tolerance limit 408, a privilege level 410, a token ID 412, a valid from 414 and a valid to 416, and the like or any combination thereof.

The privileges level 410 may include the features set by an administrator. These privileges in the privilege level 410 are enforced at the production system.

In this example, the trust level 406 may be based on account type (e.g., login account type) and previous logins. More specifically, a user may be sent a link that allows the user to register or that includes or is associated with a token. The credentials used by the user, however, may be associated with different identifiers. Example identifiers include open identifiers, semi-trusted identifiers, and trusted identifiers. An open identifier may be a public identifier (e.g., a social media account (Google, Facebook, or other similar account). A semi-trusted identifier may be associated with contractors or partners of an entity. For example, an IT service provider may be associated with user identifiers that are at least partially trusted. A trusted identifier may be a full time employee or identifiers associated with a federated provider.

For example, an entity providing temporary access as a service may issue usernames. These usernames may be trusted once issued by the entity providing temporary access as a service. In any event, however, the trust levels associated with these identifiers can be changed. Often, the initial or default trust level may depend on the identifier type, but the trust level can change based on the user's action. The trust levels associated with these different account types may vary. In one example, the entity providing the temporary access as a service may also provide an identification or authentication service. When the user logs in with a trusted account type, additional benefits can be provided based on the account type. For example, this may allow the user's actions to accumulate over time to build trust. This data, along with the data of other users, can be used in machine learning. This may allow anomalies in the user's actions to be detected more quickly and may allow the tokens to be generated more precisely and may allow resources to be managed more effectively. Data associated with monitoring a user may also be used to predict activities that are anomalies and allow action to be taken more quickly.

Because monitoring a user consumes resources and because trusted users do not need as much monitoring, a user that is able to increase their trust level is beneficial. Further, the actions of trusted users can also be used advantageously. For example, the average or expected time to perform a particular test can be learned. If a user does not perform in accordance with this learned expectation, the user's actions may merit additional monitoring or analysis.

Previous logins and accesses can also be used to influence the trust level 406. Users that perform within or above expectations with no problems may see their trust level increase. The trust level 406 can also be used for various other reasons including system protection. For example, the trust level 406 may determine permissions and restrictions. A user may not be given full access immediately, for example, based on the trust level 406. The trust level 406 may also be associated with a command delay. This command delay may prevent certain actions from immediate effect (e.g., delete file, disable network access, change firewall settings). This may allow the commands to be further authorized by an administrator or the like.

The tolerance limit 408 may define when to start active monitoring and/or when to revoke access. For example, monitoring may become more aggressive after suspicious activity is identified. Continuous monitoring may start at login. The monitoring type may create a trade off between security and resources. The token 402 can be used to implement both a trust level and a tolerance limit.

FIG. 5 illustrates an example of trust levels and tolerance limits. FIG. 5 illustrates trust levels 502. As illustrated by way of example only, trust levels may include low, medium, and high. These trust levels depend on the account type (e.g., open, semi-trusted, and trusted. These trust levels associated with these account types may also depend on previous logins. As illustrated, the trust levels are associated with different permissions and restrictions and with different command delays. These permissions and restrictions are presented by way of example only.

The tolerance limits 504 can also vary for each user. The levels may be associated with low, medium, and high tolerance limits. Generally, a low trust level is associated with a low tolerance limit. A user with a low tolerance will have their access revoked, for example, earlier than a user with a higher trust level and a higher tolerance limit.

By way of example only, a low tolerance limit, for example, may issue a single warning before revoking access for both monitoring on anomaly detection and continuous monitoring. A high tolerance limit may issue two warnings before performing active monitoring and may warn the user or an administrator that the user is being monitored. A medium tolerance limit may be somewhere in between.

FIG. 5 also illustrates an example of a distinction between continuous monitoring and monitoring on anomaly detection. Continuous monitoring may require substantial resources. As a result, continuous monitoring may only be performed for certain trust levels (e.g., low trust level). Monitoring on anomaly detection may be performed only after an anomaly is detected. An example is illustrated in FIG. 5. The warning and thresholds are configurable. As previously stated, one of the features entered by an administrator may include thresholds, including the thresholds at which warnings or actions are taken.

Figure 6:
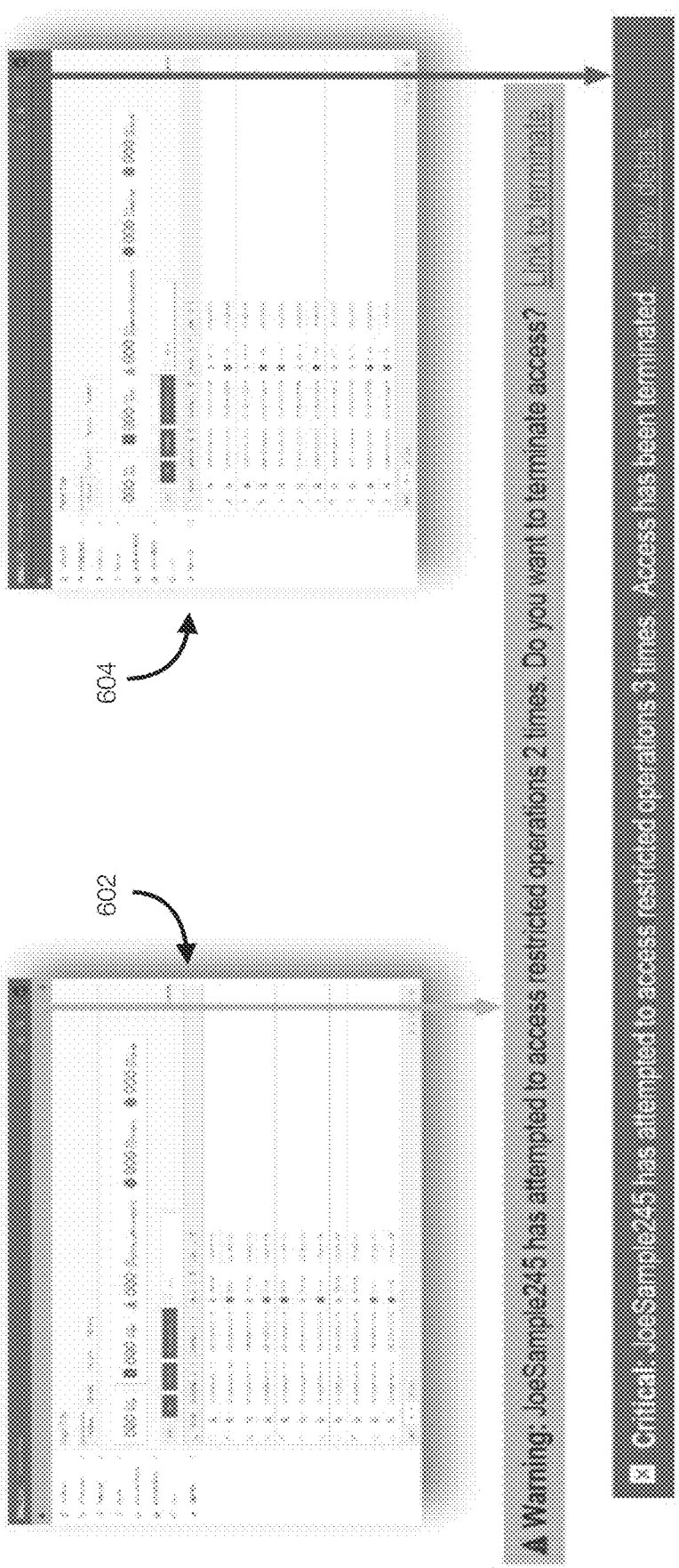
FIG. 6 discloses aspects of alerts in the context of managing or monitoring temporary access.

FIG. 6 illustrates an example of alerts generated by the access engine. FIG. 6 illustrates a user interface for a first alert 602 and a second alert 604. In the alert 602, the administrator is advised that a restricted operation has been attempted twice. This alert also gives the administrator the option of terminating access. The alert 604 advises the administrator that a restricted operation has been attempted three times and that access has been terminated. The alert may link to detail of when the attempt occurred, where the attempts occurred, the resource associated with the attempt, or the like. This allows the administrator to take any additional actions deemed necessary (e.g., removing the user from the premises). When using an authentication service associated with trusted identifiers, these actions may also be associated with the user. This may protect other entities that use the same service provider authentication service.

More generally, continuous monitoring may generate a series of alerts on the administrator console. These may include, for example, user logged in, user accessed resource, user attempted restricted resource, task completed, user logged out. Each of these alerts may be accompanied by a status level such as normal, urgent, critical, or the like. In another example, anomaly detection monitoring may not begin until an anomalous event is detected, such as attempting to access a restricted resource or the like. Further, these alerts may be influenced by the trust level and tolerance limits associated with the token.

Embodiments of the invention further relate to secure temporary access as a service from a federated perspective.

In one example, machine learning may be employed for various purposes. More specifically, the telemetry data generated by the temporary accesses can be used as training data to generate predictions regarding various aspects of providing temporary access to users. These predictions can be generalized or more specific. For example, telemetry data may be processed for specific users and for the users as a whole. The predictions may be used, by way of example, to set better time windows, to detect anomalies more quickly, to generate trust, to anticipate expense or downtime, or the like or combination thereof.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, temporary access operations. Such temporary access operations may include specifying features, monitoring users, generating alerts, anomaly detection operations, token generation operations, and the like or combination thereof. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, containers, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example. Embodiments of the invention may also be implemented as containers in a containerized environment such as Kubernetes.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: entering features into an access engine in an admin console for granting temporary access to a user to a production system, generating a token that includes claims, wherein claims are based on the features entered into the access engine, wherein the token includes a trust level of the user, sending a link that includes or is associated with the token to a user, granting a temporary access to the user to the production system based on the token, and updating a trust level associated with the user.

Embodiment 2. The method of embodiment 1, further comprising sending the features to a token server, wherein the token server generates the token to include the claims and the trust level and a tolerance limit.

Embodiment 3. The method of embodiment 1 and/or 2, further comprising determining the trust level based on an account type of the user, wherein the trust level is associated with the credential and previous logins.

Embodiment 4. The method of embodiment 1, 2, and/or 3, further comprising determining the tolerance limit based on security and resources.

Embodiment 5. The method of embodiment 1, 2, 3, and/or 4, further comprising monitoring the user on anomaly detection or continuously monitoring the user and/or receiving input from an administrator revoking access of the user based on information regarding an anomaly.

Embodiment 6. The method of embodiment 1, 2, 3, 4, and/or 5, wherein the trust level specifies permissions and restrictions and a destructive command delay.

Embodiment 7. The method of embodiment 1, 2, 3, 4, 5, and/or 6, further wherein the token server is a local token server or a federated token server.

Embodiment 8. The method of embodiment 1, 2, 3, 4, 5, 6, and/or 7, further comprising generating alerts based on actions of the user, wherein the alerts include warnings or revoking the user's access.

Embodiment 9. The method of embodiment 1, 2, 3, 4, 5, 6, 7, and/or 8, wherein the features are entered into a template or a default template presented by an access engine.

Embodiment 10. The method of embodiment 1, 2, 3, 4, 5, 6, 7, 8, and/or 9, wherein the token is generated by a federated token server, further comprising updating the trust level associated with the user based on the temporary access performed by the user.

Embodiment 11. The method of embodiment 1, 2, 3, 4, 5, 6, 7, 8, 9, and/or 10, further comprising dynamically adapting the trust level of the user based on updates provided to the federated token server from other entities and performing actions on the temporary access based on the updates.

Embodiment 12. A method for performing any of the operations, methods, or processes, or any portion of any of these or any combination or any portions thereof, disclosed herein.

Embodiment 13. A non-transitory storage medium having stored therein instructions that are executable by one or more hardware processors to perform operations comprising the operations of any one or more of embodiments 1 through 13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
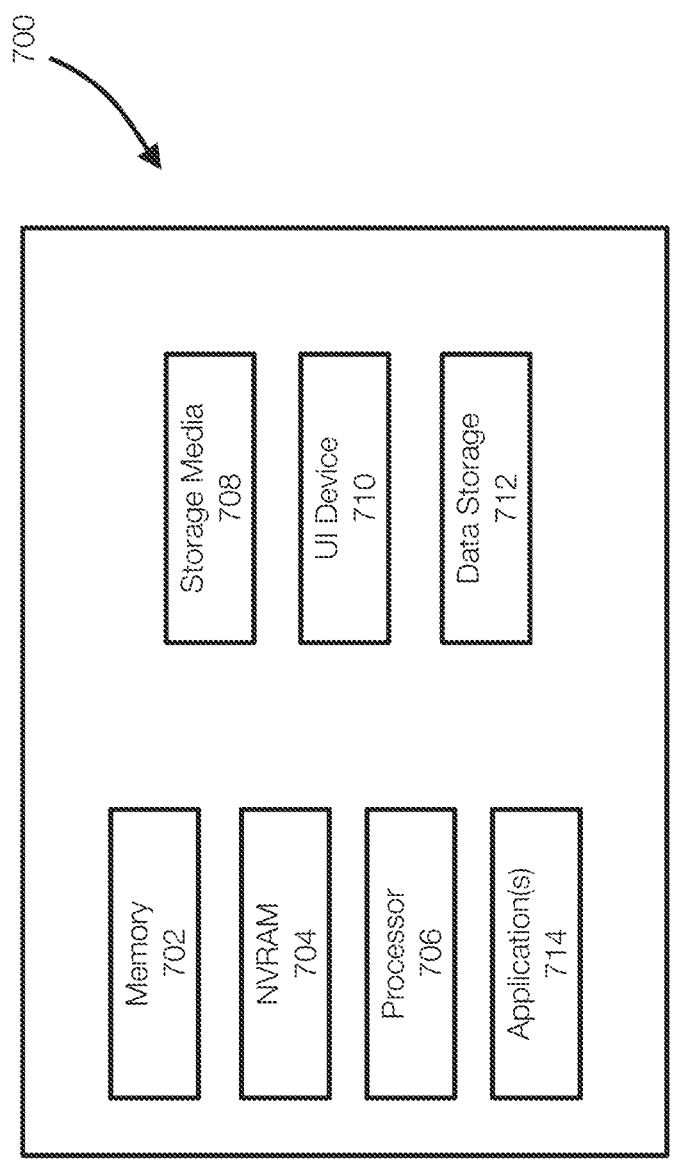
FIG. 7 discloses aspects of a computing environment.

With reference briefly now to FIG. 7, any one or more of the entities disclosed, or implied, by FIGS. 1-8 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in Figure Z.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving an access request from a user to access a production system, wherein the access request includes a token configured to grant temporary access to the user, wherein the token includes claims that include information about the user including permissions;
   granting the temporary access to the user;
   monitoring activities of the user in the production system;
   generating a session report; and
   updating a trust level of the user based on the session report.

2. The method of claim 1, further comprising revoking the temporary access when an anomaly is detected.

3. The method of claim 2, wherein the anomaly include detecting that the user attempts to perform an action that is not permitted by the token.

4. The method of claim 2, further comprising revoking the token upon detecting the anomaly.

5. The method of claim 1, further comprising starting a session when the temporary access is granted, wherein the temporary access is limited to a time window.

6. The method of claim 1, wherein monitoring the user includes one of monitoring the user periodically, monitoring the user continually, or monitoring the user upon detecting an anomaly.

7. The method of claim 1, wherein the token includes a user identifier, a trust level, a tolerance limit, a privilege level, a token identifier, and/or a token valid to from value.

8. The method of claim 1, further comprising monitoring the user in accordance with a tolerance limit for anomalies, wherein a tolerance limit for a token with low trust level is revoked earlier than a token associated with a higher tolerance limit.

9. The method of claim 1, further comprising implementing a command delay for commands issued by the user, wherein a length of the command delay depends on the trust level.

10. The method of claim 1, further comprising:
    entering features into an access engine in an admin console for granting temporary access to a user to a production system;
    generating the token such that the token includes claims, wherein the claims are based on the features entered into the access engine, wherein the token includes a trust level of the user; and
    sending a link that includes or is associated with the token to the user.

11. The method of claim 10, further comprising sending the features to a token server, wherein the token server generates the token to include the claims and the trust level and a tolerance limit.

12. The method of claim 11, further comprising determining the trust level based on an account type of the user, wherein the trust level is associated with a credential and previous logins.

13. The method of claim 12, further comprising determining the tolerance limit based on security and resources.

14. The method of claim 1, further comprising dynamically adapting the trust level of the user based on updates provided to a federated token server from other entities and performing actions on the temporary access based on the updates.

15. A non-transitory storage medium having stored therein instructions that are executable by one or more hardware processors to perform operations comprising:
    receiving an access request from a user to access a production system, wherein the access request includes a token configured to grant temporary access to the user, wherein the token includes claims that include information about the user including permissions;
    granting the temporary access to the user;
    monitoring activities of the user in the production system;
    generating a session report; and
    updating a trust level of the user based on the session report.

16. The non-transitory storage medium of claim 15, further comprising:
    revoking the temporary access when an anomaly is detected, wherein the anomaly include detecting that the user attempts to perform an action that is not permitted by the token or revoking the token upon detecting the anomaly.

17. The non-transitory storage medium of claim 15, further comprising starting a session when the temporary access is granted, wherein the temporary access is limited to a time window, wherein monitoring the user includes one of monitoring the user periodically, monitoring the user continually, or monitoring the user upon detecting an anomaly, wherein the token includes a user identifier, a trust level, a tolerance limit, a privilege level, a token identifier, and/or a token valid to from value.

18. The non-transitory storage medium of claim 15, further comprising monitoring the user in accordance with a tolerance limit for anomalies, wherein a tolerance limit for a token with low trust level is revoked earlier than a token associated with a higher tolerance limit and/or implementing a command delay for commands issued by the user, wherein a length of the command delay depends on the trust level.

19. The non-transitory storage medium of claim 15, further comprising entering features into an access engine in an admin console for granting temporary access to a user to a production system;
   generating the token such that the token includes claims, wherein the claims are based on the features entered into the access engine, wherein the token includes a trust level of the user; and
   sending a link that includes or is associated with the token to the user.

20. A method comprising:
   receiving an access request from a user to access a production system, wherein the access request includes a token configured to grant temporary access to the user, wherein the token includes claims that include information about the user including permissions;
   granting the temporary access to the user;
   monitoring activities of the user in the production system; and
   revoking the temporary access when an anomaly is detected.

\* \* \* \* \*